United States Patent [19]

Parent et al.

[11] Patent Number: 4,912,857

[45] Date of Patent: Apr. 3, 1990

[54] COOLING AND EXHAUST UNIT FOR SOLDER REFLOW SYSTEM

[75] Inventors: Francois Parent, Montreal; Carlos Deambrosio, Candiac; John Gileta, Chateauguay, all of Canada

[73] Assignee: Electrovert Ltd., Toronto, Canada

[21] Appl. No.: 378,856

[22] Filed: Jul. 12, 1989

Related U.S. Application Data

[63] Continuation of Ser. No. 258,566, Oct. 17, 1988, abandoned.

[51] Int. Cl.[4] ............................................. F26B 25/08
[52] U.S. Cl. ............................................. 34/148; 34/66; 34/242; 98/115.1; 228/46
[58] Field of Search ............ 34/20, 66, 148, 218, 34/230-235, 242; 98/36, 115.1, 115.3; 228/46, 200

[56] References Cited

U.S. PATENT DOCUMENTS

| | | | |
|---|---|---|---|
| 2,409,298 | 10/1946 | Merrill | 34/66 |
| 3,727,324 | 4/1973 | Melgaard | 34/66 X |
| 3,851,402 | 12/1974 | Turnbull et al. | 34/218 X |
| 4,361,967 | 12/1982 | Bahnsen et al. | 228/46 X |
| 4,535,548 | 8/1985 | Hyde | 34/66 X |

FOREIGN PATENT DOCUMENTS 3611180  1/1987  Fed. Rep. of Germany ........ 228/46

OTHER PUBLICATIONS

Research Inc. "Radiant Energy" (2 pages).
SPT International Inc. 770L-8 Zone (2 pages).
Dynapert RC-18 (2 pages).
Vitronics SMD 700 (2 pages).
Radiant Technology Corp. SMD-6000 (2 pages).
Radiant Technology Cor;. SMD-624-924-1224 (2 pages).
Radiant Technology Corp. SMD-3000 (2 pages).
SENJU (2 pages).
EXCEL (2 pages).

*Primary Examiner*—Harold Joyce
*Attorney, Agent, or Firm*—Darby & Darby

[57] ABSTRACT

A cooling and exhaust unit for an IR reflow soldering machine is arranged to be mounted on the soldering machine after the last heating zone. The unit has fans which direct cold air downwardly on to the conveyor and this cooling air divides into two streams, one moving with the conveyor and one counter to the movement of the conveyor. An exhaust inlet is provided near the front and the rear of the machine, the exhaust inlets being connected through an exhaust chamber to an exhaust outlet. To minimize the amount of hot process air sucked out of the soldering machine into the nearer exhaust inlet an additional cold air inlet is provided, this being located intermediate the rear end of the unit (i.e., the end abutting the soldering machine) and the nearer exhaust inlet.

8 Claims, 2 Drawing Sheets

COOLING AND EXHAUST UNIT FOR SOLDER REFLOW SYSTEM

This is a continuation of application Ser. No. 258,566, Oct. 17, 1988, now abandoned.

BACKGROUND OF THE INVENTION

This invention relates to the cooling of components such as printed circuit boards (PCB's) which have been subjected to a soldering operation in an automatic soldering machine.

Some PCB's do not have throughholes and these are known as surface mount devices (SMD's). A preferred soldering technique for SMD's is infrared (IR) reflow in which solder paste on the PCB's is caused to reflow upon the application of heat. More particularly, heating takes place in separately controlled zones within the machine permitting precise temperature profiling. The boards pass by wire mesh conveyor first into a preheat zone which gently heats the solder paste to drive off volatile solvents and avoid thermal shock to the PCB's. After preheating, the PCB's pass into the main heating zones where they are raised to reflow temperature. On exiting from the heating zones the boards are cooled, typically by blowing air up through the conveyor mesh, to solidify the solder joints.

A disadvantage with this conventional cooling system is that the bottom cooling fans bring turbulence into the heating zones when the PCB's are over the fans. This turbulent cool air entering the heating zones distrubs the process chamber environment. Another disadvantage is that the cooling across the conveyor is non-uniform so that the cooling across the PCB's is non-uniform. Furthermore solder and flux fumes Which leak out of the last heating zone and which are also generated during cooling are not dealt with by the conventional cooling system and these cause environmental pollution and discomfort to the operator.

SUMMARY OF THE INVENTION

These disadvantages are largely overcome by means of the combined cooling and exhaust unit of the present invention which is mountable on the soldering machine above the conveyor at a location where the conveyor exits the process section. The novel unit is provided within a housing with means for directing cooling air downwardly on to the conveyor at a location between a forward end and a rear end of the unit. Also provided within the housing is means for exhausting air and fumes, which comprises a first exhaust inlet proximate the forward end and a second exhaust inlet proximate the rear end. Thus, the cooling air passes up and down the conveyor in two separate streams which are then exhausted via the two exhaust inlets.

An important feature of the invention is the provision of second means for directing cooling air to the conveyor at a location between the second exhaust inlet and the rear end of the unit. This has the effect of reducing the amount of process air sucked into the cooling and exhaust unit from the heating zones. This is a desirable effect because loss of process air represents loss of required heat from the process section and also an unbalancing of the soldering process.

DESCRIPTION OF THE PREFERRED EMBODIMENT

Figure 1:
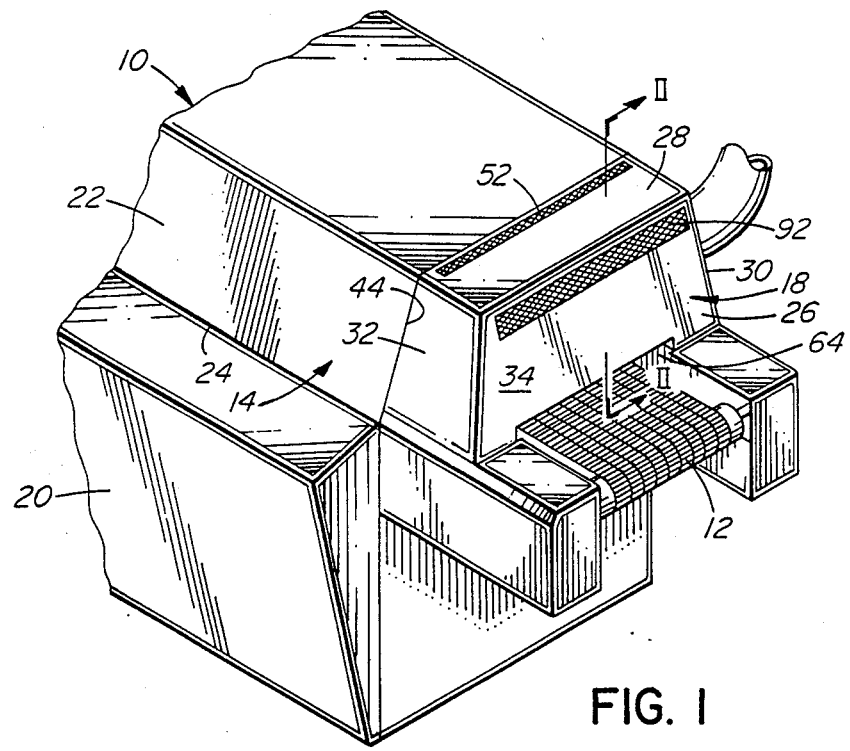
FIG. 1 is a perspective view of a portion of an IR reflow soldering machine illustrating the cooling and exhaust unit of the invention.

Referring firstly to FIG. 1, an IR reflow soldering machine 10 includes a wire mesh conveyor 12 for carrying printed circuit boards (not shown) of the SMD type from left to right through a series of heater zones 14 formed by IR heaters enclosed within a sheet metal housing 16 of the machine 10 and located above and below conveyor 12. A cooling and exhaust unit 18 is mounted to the machine 10 at the right hand end of the machine, i.e., after the last heater zone 14.

More particularly the housing 16 is formed of a main housing portion 20 which extends from the floor up to conveyor 12 and a lid portion 22 which extends above conveyor 12. Lid portion 22 is hingedly connected to main portion 20 by means of a hinge 24 running the length of the housing. In the operating position the lid is in the down position as shown and may be swung to an up position for access to the conveyor 12 and IR heaters to facilitate maintenance and cleaning. The cooling and exhaust unit 18 has a sheet metal housing 26 which is identical in cross-sectional shape and dimensions to the cross-sectional shape and dimensions of the lid portion 22. Thus, the top 28 of housing 26 is horizontal, one side wall 30 is vertical and an opposite side wall 32 slopes outwardly from the vertical in a direction down from the top 28. The housing 26 also has a front wall 34 which, as can be seen more clearly in FIG. 2, slopes outwardly from the vertical in a direction down from top 28.

Figure 2:
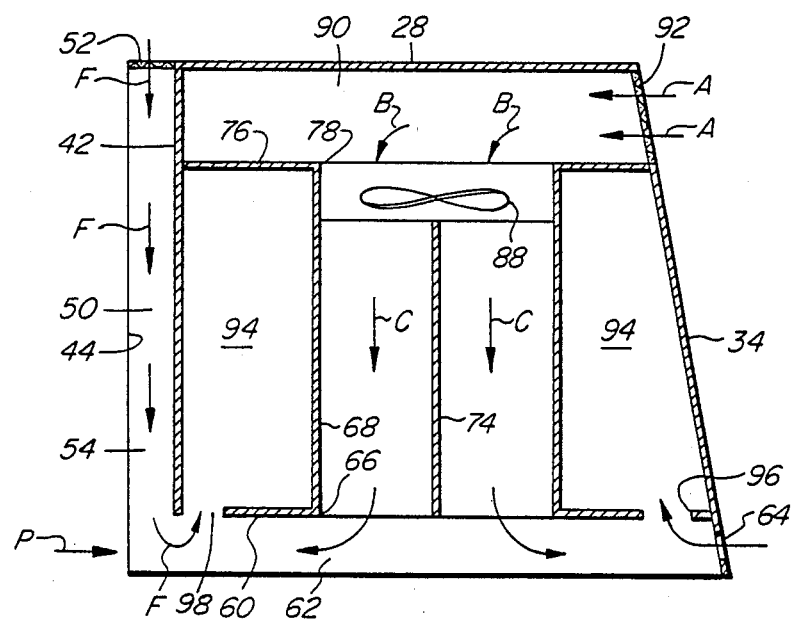
FIG. 2 is a longitudinal sectional view taken on II—II of FIG. 1 but drawn to a larger scale.
Figure 3:
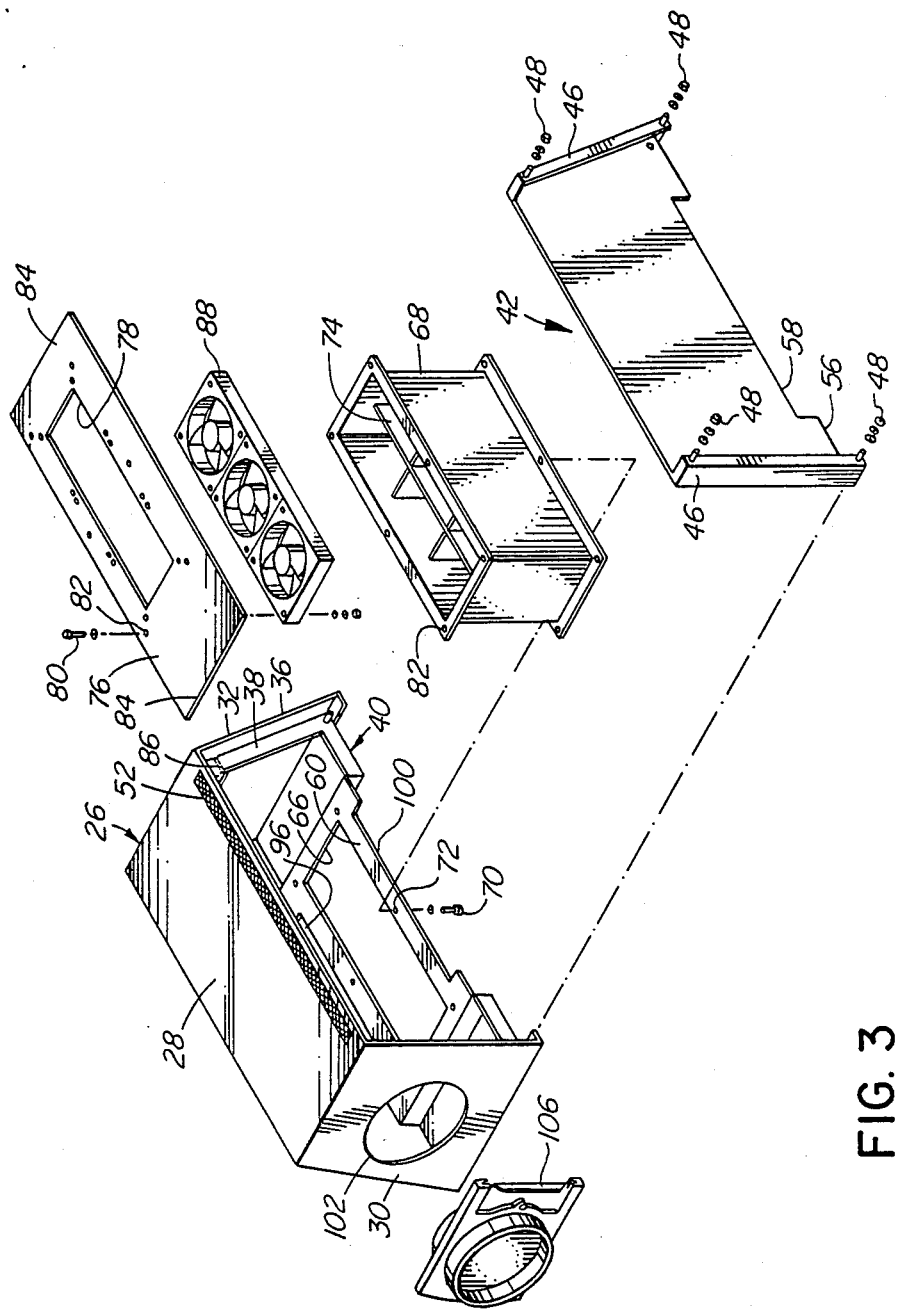
FIG. 3 is an exploded perspective view of the cooling and exhaust unit of FIGS. 1 and 2, illustrating the unit from a viewpoint diagonally opposite from that of FIG. 1.

Referring now to FIGS. 2 and 3 in conjunction with FIG. 1, the rear end 36 of housing 26 is seen to be open, there being a flange 38 formed internally of the housing and spaced from the rear end 36. The flange 38 extends down both side wall inner surfaces and along the top wall inner surface of housing 26 as well as partially along a base plate 40. A plate 42 corresponding in shape to the rear end of housing 26 but slightly smaller is secured to the flange 2 and to an end wall 44 of the lid portion 22 of IR machine housing 16 by means of flange portions 46 and fasteners 48. In this way housing 26 is secured to lid portion 22 and plate 42 defines with end wall 44 of lid portion 22 a vertical chamber or duct 50.

The chamber 50 is vertically disposed with an inlet 52 formed as a grill on top 28 of housing 26 and an outlet 54 formed between the lower end 56 of plate 42 and end wall 44. Grill 52 extends almost the entire width of housing 26.

As seen in FIG. 3 the lower end 56 of plate 42 has a recessed centre portion 58 and it is along this recessed portion 58 that the outlet 54 extends. The recessed portion 58 is aligned with a raised centre portion 60 of housing base plate 40 which raised portion 60 defines a central channel 62 running the length of the cooling and exhaust unit. As can be seen in FIG. 1, channel 62 is wider than and registers with conveyor 12 and opens on front wall 34 at mouth 64.

Still referring to FIG. 3, channel 62 is formed with a rectangular aperture 66. A rectangular vertical duct 68 is mounted on top of channel 62 by means of appropriate fasteners 70 and holes 72 such that it registers with aperture 66. The duct is formed internally with a rectangular array of baffle plates 74. An upper plate 76 also formed with a rectangular aperture 78 is mounted to the top of duct 68 by means of appropriate fasteners 80 and holes 82 such that aperture 78 registers with duct 68. The plate 76 is mounted to the housing 26 of unit 18 by virtue of edge portions 84 of plate 76 being received in respective slots 86 (only one seen in FIG. 3) in flange 38. Three fans 88 are mounted to the underside of plate 76 and are shaped and dimensioned to fit snugly within the upper end portion of duct 68 as seen in FIG. 2.

When in position within slots 86, upper plate 76 defines with the top 28 of the housing 26 a horizontal chamber or duct 90 with an inlet 92 formed as a grill provided on the sloping front wall 34 of the housing, the grill extending almost the width of the housing. Aperture 78 serves as an outlet of the chamber 90 and an inlet of the duct 68. The outlet of duct 68 is, of course, aperture 66 which communicates with channel 62.

An exhaust chamber 94 is defined in the space bounded by duct 68, the surrounding, spaced walls of housing 26, base plate 40 and upper plate 76. Exhaust chamber has two inlets 96 and 98. Inlet 96 is formed as a slot through raised portion 60 of base plate 40, the slot extending across the base plate proximate to the mouth 64 of channel 62. Inlet 98 is a slot of similar shape and dimensions to slot 96 but it is located adjacent plate 42 and, in fact, is defined by plate 42 and a rectangular recess 100 formed in the rear edge of base plate section 60. Slots 96 and 98 extend across the width of the conveyor 12.

Housing wall 30 has an aperture 102 therein serving as an outlet of exhaust chamber 94. An exhaust duct 104 formed as a flexible tube has one end secured in outlet 102 and may be provided with a shutter or gate 106 for adjusting manually the effective area of outlet 102. The other end (not shown) of exhaust duct 104 is connected to the shop exhaust system which typically would include an exhaust fan.

In operation, with the conveyor 12 carrying hot soldered PCB's out of the heating zones 14 and into cooling and exhaust unit 18, the system is balanced by adjusting exhaust gate 106 and the speed of the fans 88 until the amount of process air, indicated by arrow P in FIG. 2, entering the cooling and exhaust unit 18 from the heating zones 14 is minimized. The fans 88 suck cold air through inlet 92 and horizontal duct 90 and blow that cold air down through duct 68 on to conveyor 12.

The arrows A, B, C, D and E illustrate the direction in which the cooling air flows. Arrow D shows the cold air flow which occurs counter to the direction of travel of conveyor 12, i.e., towards the heating zones 14. The cold air of arrow D is heated by the PCB's on conveyor 12 and carries fumes from the PCB's to exhaust inlet 98. There is a tendency for the exhaust fan to draw process air P into exhaust inlet 98, which would be undesirable because it would represent a loss of desired heat from the heating zones. However, the presence of duct 50 between exhaust inlet 98 and the location where process air P would leak from the heating zones counteracts this tendency, at least to some extent. Thus, more cool air represented by arrows F is sucked through inlet 52 and chamber 50 to exhaust inlet 98.

Turning now to airflow E, this shows the cool air flow along the direction of travel of the conveyor 12, this air flow being heated by the PCB's and carrying fumes from the PCB's to exhaust inlet 96. Cold air represented by arrow G is sucked by the exhaust fan into mouth 64 from the front of unit 18 and into exhaust inlet 96. If the airflow E when it reaches exhaust inlet 96 is sufficiently strong to overcome in part the suction of the exhaust fan a portion of airflow E will escape out of mouth 64. This escaped air (and fumes) will, however, rise along the outer face of front wall 34 and re-enter the system via inlet 92. The slope of the front wall 34 enhances this effect but the unit would still be operable if the wall 34 were vertical.

Because the exhaust outlet 102 is located in one of the side walls there is greater suction at those ends of the exhaust inlets 96 and 98 nearer the exhaust outlet 102, i.e., there is a slight pressure differential or gradient along the exhaust inlets. Although this detracts from the ability to achieve uniform cooling across conveyor 12, the effect is not substantial and is acceptable. However, if greater uniformity is desired baffles could be arranged within chamber 94 so that the greatest suction is achieved at the midpoints of the inlets 96 and 9 which would cause a reduction in the gradient along the inlets.

Although the preferred embodiment of the invention has been described in conjunction with an IR reflow soldering machine it should be appreciated that the cooling and exhaust unit of the invention can equally well be used with other types of soldering machines.

Other modifications and improvements will occur to those skilled in the art.

What we claim is:

1. A combined cooling and exhaust apparatus for use with a soldering machine having a process section operating at high temperature and a conveyor for carrying products to be soldered through the process section where soldering takes place, the cooling and exhaust apparatus being mountable on the soldering machine above the conveyor at a location where the conveyor exits the process section and comprising within a housing first means for directing cooling air downwardly on to the conveyor at a location between a forward end and a rear end of the apparatus, means for exhausting air and fumes from the apparatus and including a first exhaust inlet proximate the forward end and a second exhaust inlet proximate the rear end, and second means for directing cooling air downwardly to the conveyor at a location between the first exhaust inlet and the exist end of the process section, whereby suction of process air from the process section into the cooling and exhausting apparatus is reduced by said second means.

2. Apparatus as defined in claim 1 wherein the second means comprises a substantially vertical duct having an inlet located on a top of the housing and an outlet spaced from a top surface of the conveyor, the duct extending across the width of the conveyor.

3. Apparatus as defined in claim 2 wherein the duct is defined by three vertical walls forming part of the apparatus and by a vertical end wall of the process section of the soldering machine when the apparatus is mounted to the soldering machine.

4. Apparatus according to claim 1 wherein the first means comprises duct means having a substantially horizontal portion with an inlet located on a front wall of the housing and a substantially vertical portion with an outlet spaced from a top surface of the conveyor, and fan means located in the duct means, the duct means extending across the width of the conveyor.

5. Apparatus according to claim 4 Wherein the front wall slopes outwardly from a top of the housing towards the bottom.

6. Apparatus according to claim 4 wherein the vertical portion of the duct means includes a vertical array of baffle plates.

7. Apparatus according to claim 4 wherein the means for exhausting comprises a chamber surrounding the vertical portion, and an exhaust outlet in a side wall of the housing and wherein the exhaust inlets extend across the width of the conveyor.

8. Apparatus according to claim 7 wherein the exhaust outlet is provided with a manually adjustable damper.

* * * * *